Sept. 18, 1934.  W. F. ATWOOD  1,974,094
VALVE GEAR
Filed Dec. 17, 1931  3 Sheets-Sheet 1
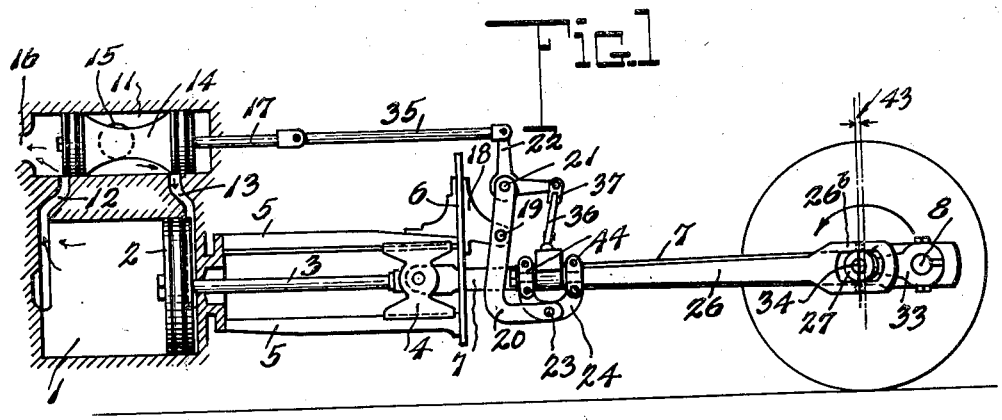
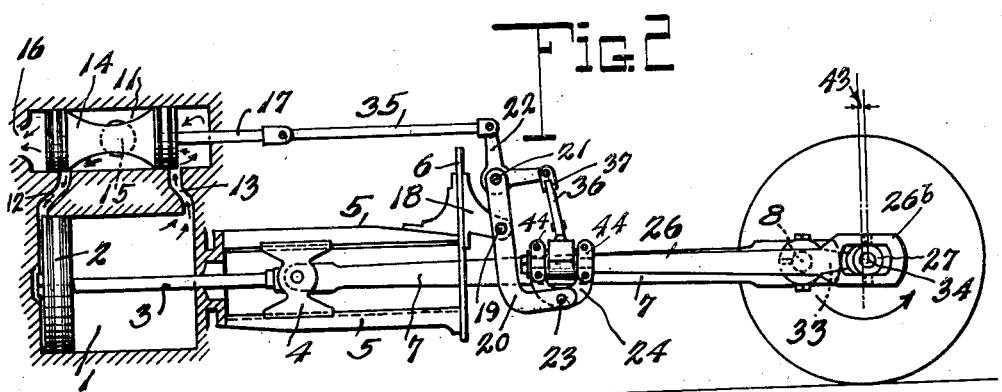
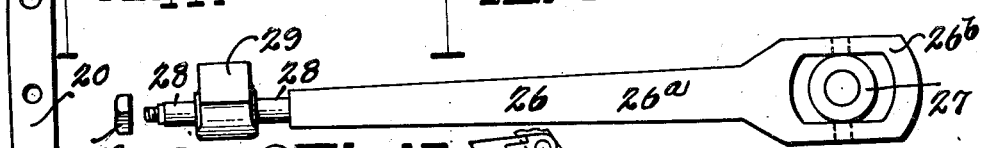

Sept. 18, 1934. W. F. ATWOOD 1,974,094
VALVE GEAR
Filed Dec. 17, 1931 3 Sheets-Sheet 2
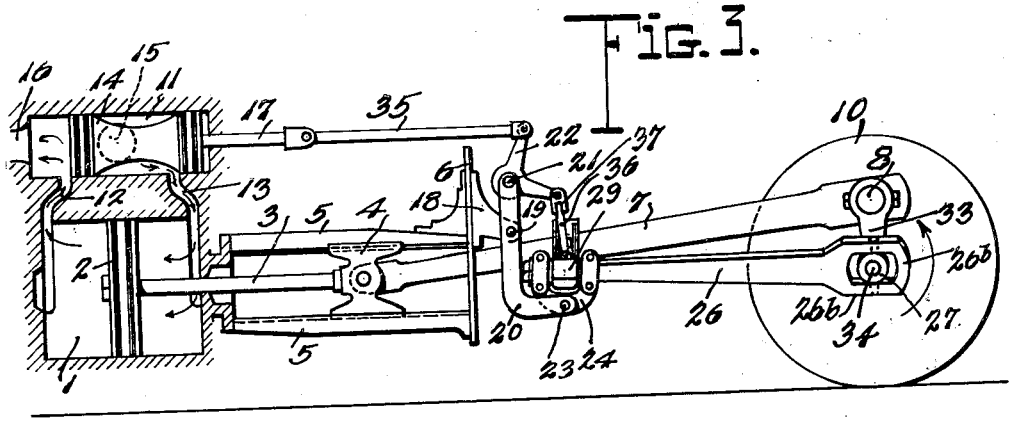
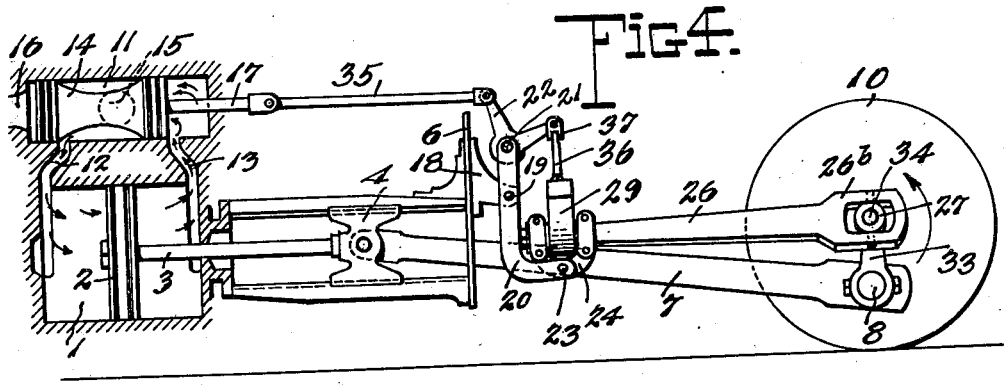
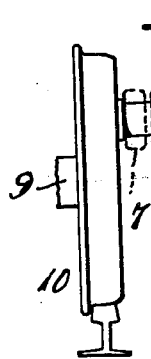 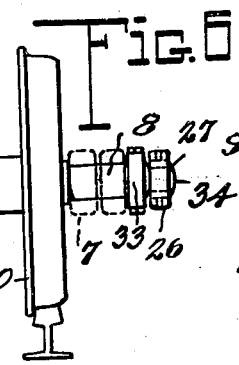 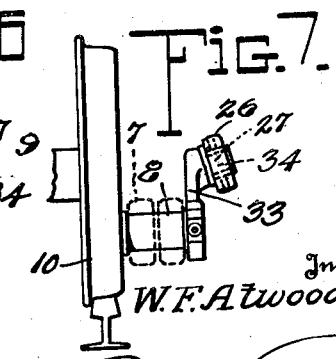
Inventor
W. F. Atwood
By Robb & Robb
Attorneys Sept. 18, 1934.  W. F. ATWOOD  1,974,094
VALVE GEAR
Filed Dec. 17, 1931   3 Sheets-Sheet 3
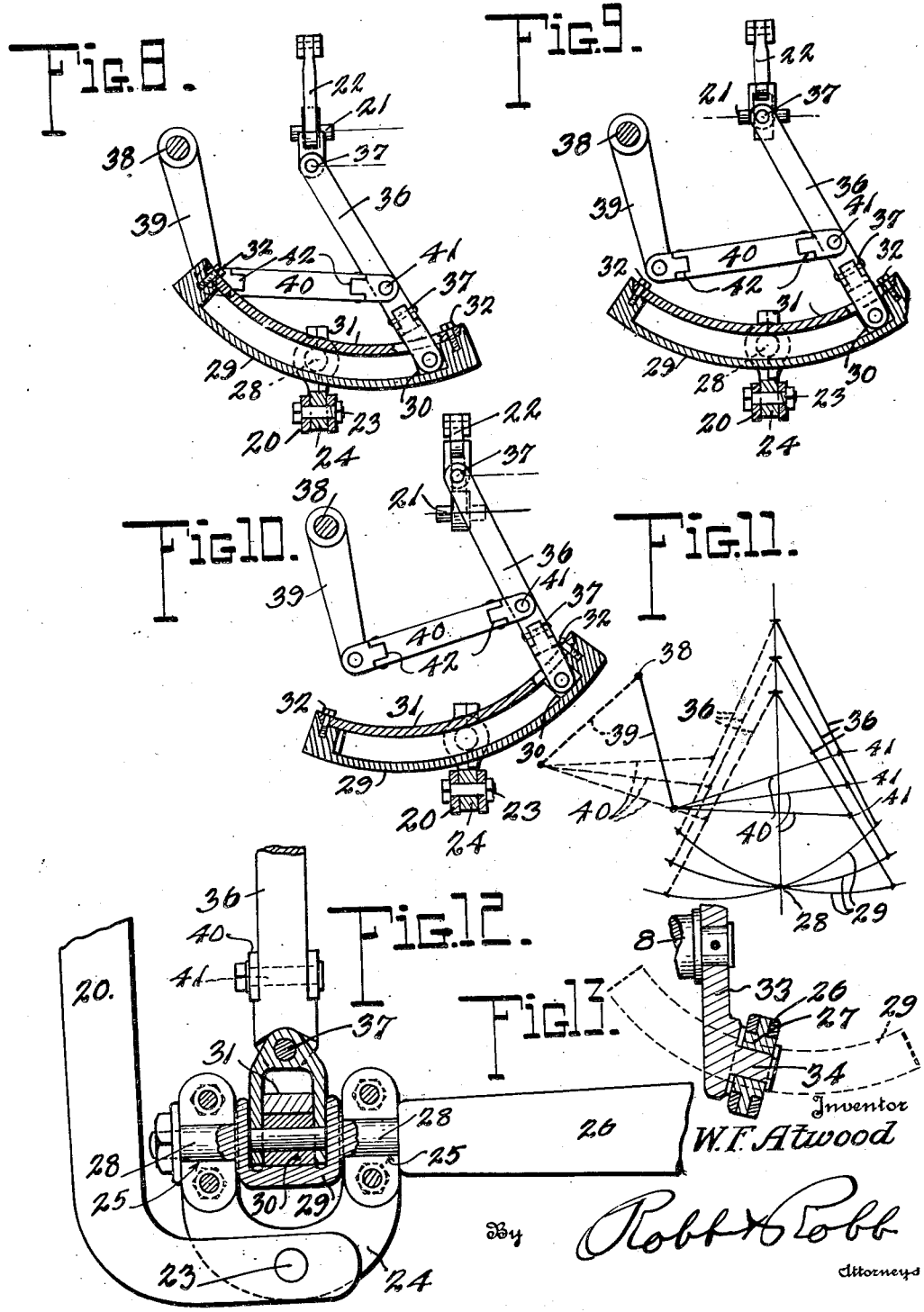

Patented Sept. 18, 1934

1,974,094

UNITED STATES PATENT OFFICE 1,974,094

VALVE GEAR

Walter F. Atwood, Amarillo, Tex.

Application December 17, 1931, Serial No. 581,735

18 Claims. (Cl. 121—163)

This invention relates to improvements in valve gear for engines and more particularly to valve gear for steam engines of the locomotive type.

An object of my invention is to provide a valve gear having a constant lap and lead of the most efficient type having a minimum number of working parts.

Another object of my invention is to provide a combined actuating member for the valve gear which affects both the lap and lead movements of the valve and the full linear advance movements without the use of auxiliary mechanisms such as double eccentrics and connections to the piston rod cross head.

Another object of my invention is to provide an actuator for the valve gear having a combined reciprocatory and oscillatory movement, one of said movements being used to actuate the valve for lap and lead or cut-off travel while the other movement is utilized to produce the linear advance movements of the valve.

A further object is to provide a valve actuating gear having a single operating element and combining two relatively angular movements of the operating element to produce the linear advance movement of the valve and the independent early cut-off movements to permit the expansion property of the steam to be used for moving the piston, together with means to reverse the direction of travel of the valve with respect to the single operating element.

A still further object is to provide a valve gear for steam engines or the like having a pair of oscillating members, one of said members having reciprocatory movement as well as oscillating movement and means for causing the lap and lead travel of the valve incident to the reciprocatory movement and normal linear advance movement of the valve incident to the oscillatory movement.

Other and further objects and advantages of the invention will be hereinafter set forth and the novel features thereof defined by the appended claims.

In the drawings:

Fig. 1 is a diagrammatic side elevation of my improved valve gear showing the crank on the rear quarter and illustrating the lap and lead position of the valve with the crank in this position, Fig. 2 is a view similar to Fig. 1 showing the crank in the forward quarter position, Figs. 3 and 4 are views similar to Fig. 1 except that the crank is shown in the top and bottom quarter respectively, these views disclose the full linear advance movements of the valve incident to the oscillation of the actuator while Figs. 1 and 2 disclose the lap and lead movements of the valve incident to reciprocation of the actuator.

Figs. 5, 6 and 7 are fragmentary detailed views of the crank and the end of the actuator disclosing how the rotation of the crank oscillates this actuator.

Figs. 8, 9 and 10 are vertical cross-sectional views taken through the reverse link and show the corresponding positions of the link when the crank is in the position shown in Figs. 5, 6 and 7, respectively, Fig. 11 is a diagram of the reverse link and its associated parts, the dotted lines representing the parts when the valve gear is moved into full reverse position, Fig. 12 is a fragmentary view showing the reverse link and link block in section and disclosing the method of mounting of these elements and their associated parts on the lap and lead lever, Fig. 13 is a fragmentary detail sectional view of the angle crank carrying arm showing its connection to the valve gear actuator, Fig. 14 is a side elevation of the lap and lead lever, Fig. 15 is a plan view of the combined actuator and reverse link member, Fig. 16 is a plan view of the link carrier, Fig. 17 is an end view of the actuator and reverse link as seen in Fig. 15, the link plate being partly removed therefrom, and Fig. 18 is a fragmentary view showing the link block and a portion of the radius rod and the link block shifting link.

Like characters designate corresponding parts in the several figures of the drawings.

Referring generally to Figs. 1 to 4 of the drawings which denotes the main steam cylinder 1 in which a piston 2 operates, the piston rod 3 being connected to the usual cross head 4 traveling in suitable guides 5 to which is attached the valve gear frame 6. A pitman 7 connects the cross head 4 with the crank 8 on the crank shaft 9 which as seen in Figs. 4, 5 and 6 constitutes the main axle of the driving wheels 10 when the valve gear is mounted on a locomotive.

A valve chest 11 having passages 12 and 13 communicating with the ends of the cylinder 1 is provided as clearly seen in the drawings with a reciprocating hollow valve 14 for controlling the aforementioned ports or passages 12 and 13, thereby permitting exhaust through passage 13. Steam is admitted through the live steam port 15 and after the steam has actuated the piston it is discharged through the exhaust port 16.

A valve stem 17 is connected to the valve in the usual manner and passes to the exterior of the valve chest through the usual stuffing box (not shown).

The valve gear frame 6 carries a bracket 18 to which is pivoted at 19 the lap and lead member 20. This lever as seen in the drawings is substantially L-shaped and carries pivoted to the upper end thereof at 21 the bell crank combination lever 22. Pivoted at 23 to the angular extension of the lap and lead lever 20 is the link carrier 24 as seen in detail in Figures 12 and 16. This link carrier is provided with bearings 25 in which is journalled the oscillating reverse link actuator 26.

The actuator 26 as seen more particularly in Fig. 15 comprises a main body portion 26a having an apertured head 26b in which is arranged the swivel collar 27. The other end of the body is formed to provide the trunnion bearings 28. The reverse link 29 is disposed intermediate the trunnions 28 and is recessed to receive the reverse link block 30. A reverse link plate 31 is provided for retaining the block in slidable engagement within the reverse link. The end of the actuator 26 is threaded to receive the abutment nut 26c which may be adjusted on the actuator to take up any play which may exist between the sides of the link carrier and the link when the actuator is in operating position on the carrier. The link plate is removably secured on the reverse link in any suitable manner such as by the screws 32.

As disclosed in Figures 5, 6 and 7 of the drawings, the main crank 8 has pinned thereon an arm 33 which extends radially inward toward the axis of rotation of the shaft 9. The arm 33 has formed thereon the inclined angle crank 34, the axis of which is located adjacent to but out of alignment with the axis of the shaft 9. This crank is disposed at an inclined angle to the axis of the main crank 8, and also to the axis of the shaft or axle 9.

A swivel collar 27 is journaled on the inclined crank, said collar being pivotally secured to one end of the actuator 26. Due to the inclination of the angle crank and its offset relation to the shaft or axle 9, the collar will be given an oscillating movement about the central axis of the shaft 9, the stroke or amount of this movement being indicated at 43.

Upon rotation of the shaft 9 the inclined crank 34 will rotate around the axis of the shaft or axle 9 but the actuator 26 due to its swivel connection with the angle crank through the collar 27 will be given a combined longitudinal component of movement and an oscillating component of movement on its longitudinal axis. The valve 14 has a longitudinal axis. The valve 14 has a longitudinal component of movement only for both lap and lead and linear advance movements. From the above it will be observed that the angle crank 34 constitutes a common actuating means to produce two independent components of movements of the actuator 26, namely the longitudinal movement which rocks the lever 20 on its pivotal axis 19 and the oscillating movement which rocks the reverse link 29 and in turn rocks the bell crank combination lever 22 on its axis 21. Both of these movements are converted into a longitudinal valve actuating movement. A valve spindle link 35 connects the valve spindle or rod 17 with one arm of the bell crank combination lever 22 while a radius rod or link 36 connects the other arm of the bell crank combination lever 22 to the reverse link block 30. Suitable universal connections are provided in the radius rod 36 at 37 to allow for the relative oscillatory swing of the lap and lead lever. A reverse shaft 38 is provided for shifting the link block 30 within the reverse link 31 so as to control the amount of linear advance movement of the valve and to effect reverse actuation of the valve gear. This reverse shaft has fixed thereon a reverse arm 39 to which is pivoted the connecting link 40. The other end of the connecting link is pivoted to the radius rod 36 at 41 as clearly seen in Figs. 8, 9, 10 and 11 of the drawings. The connecting link 40 is provided with supplemental pivotal connections 42 to permit the relative longitudinal shifting movements between the reverse arm 39 and the radius rod 36 incident to oscillation of the lap and lead lever.

Referring to Figs. 1 and 2 of the drawings it should be observed that regardless of the position of the link block 30 within the reverse link 39 when the parts are in the positions as shown, a positive lap and lead movement of the valve is effected, Fig. 1 representing the lap and lead position for the valve when the crank is in the rear quarter while Fig. 2 represents the lap and lead position for the valve when the crank is in the forward quarter. The distance of longitudinal movement of the actuator 26 when the crank 8 is rotated from the position shown in Fig. 1 to the top or bottom center is indicated in these figures at 43 and it should be observed that with the link block 30 in the central or neutral position of the reverse link rotation of the angle crank 34 will cause lap and lead movements of the valve 14 while no actuation of the bell crank combination lever by the reverse link will occur. As the main crank moves from the forward or rear quarter to the top or bottom quarter as seen in Figures 3 and 4 of the drawings rotation of the angle crank causes the actuator 26 to tilt thereby causing corresponding tilting movement of the reverse link 29 which movement actuates the radius rod 36 rocking the bell crank combination lever 22 in one direction or the other causing the valve spindle link 35 to actuate the valve 14 for linear advance movement thereof. Shifting of the reverse shaft moves the reverse link block to a different position in the reverse link and correspondingly changes the amount of linear advance movement of the valve 14 or reverses the direction of the linear advance movement. The lap and lead movement of the valve remaining the same under these circumstances. The reverse link carrier 24 as seen in the drawings is provided with removable bearing caps 44 to facilitate removal of the actuator 26 therefrom. Referring to Figs. 1 to 4, it will be observed that an inside admission valve is used, and the lap and lead motion is in phase with the piston and that the angular advance movement is out of phase by 90 degrees, or, in other words, it follows the main crank by 90 degrees.

Having thus described my invention, what I claim as new and desire to secure by letters patent is:

1. In a valve gear, the combination with a valve and a valve rod, of a lap and lead lever, combination means connecting said lap and lead lever to said valve rod, an inclined crank, an actuating member connected between the lap and lead lever and said crank having a rotary oscillating connection with said crank to effect reciprocatory movement of said member to communicate lap and lead movement to the valve and oscillating movement of said member, and means for converting said oscillating movement of said member into linear advance movement of the valve including said combination means.

2. In a valve gear, a valve rod, a valve associated therewith a lap and lead lever, a reverse link supported by said lap and lead lever, an inclined angle crank, constituting common actuating means for oscillating said lap and lead lever and oscillating said reverse link, and means for actuating said valve rod from said reverse link for effecting linear advance movement of the valve and from said lap and lead lever for effecting lap and lead movements of the valve.

3. In a valve gear, a valve, a valve actuating mechanism therefor including a constant lap and lead valve actuating mechanism and a variable linear advance and reversing mechanism for said valve, an inclined crank, an operating member operatively connected to the aforesaid mechanisms and having a rotary oscillating connection with said crank whereby rotation of said crank communicates a compound oscillating and longitudinal reciprocating movement to said member, and combination connecting means for effecting said lap and lead movement of the valve from the longitudinal reciprocating movement of the member and for effecting linear advance movement of the valve from said oscillatory movement, means for adjusting said linear advance mechanism to vary the degree of movement of said mechanism and to reverse said linear advance mechanism.

4. A valve actuating mechanism of the class described, the combination with a valve rod, of a lap and lead lever, a reverse link supported thereby, an inclined angle crank for actuating said lap and lead lever and oscillating said reverse link including means connected to said crank said reverse link and said lap and lead lever for reciprocatory and oscillatory movement instant to rotation of said crank whereby reciprocatory movement causes actuation of said lap and lead member and oscillatory movement causes oscillation of said reverse link, and means on said lap and lead lever for actuating said valve rod incident to movement of said lap and lead member and oscillation of said reverse link.

5. In a valve gear, a main driving crank, an inclined angle crank carried by said main crank, said angle crank being disposed at an inclined angle to the axis of revolution of the main crank, a main cylinder, a piston thereon, means for rotating the main crank from said piston, a valve chamber, steam ports extending between the valve chamber and said cylinder, a valve for controlling said ports, lap and lead valve operating mechanism, linear advance valve operating mechanism, a common actuator for said mechanisms having a reciprocatory movement for operating said lap and lead mechanism, an oscillatory movement for operating said linear advance mechanism and means for swivelly connecting said common actuator to said angle crank.

6. In a valve gear for locomotives, a valve to be actuated, a support, a lever pivotally carried by the support, a second lever carried by the first lever, a common actuator for said levers having a plurality of movement in different angular planes for independently swinging both of said levers and an operating connection between the valve and the second lever.

7. In a valve gear of the class described, a valve to be actuated, a shaft, an actuator operable from said shaft for shifting said valve having a longitudinal reciprocating and axial oscillating movement, means to reciprocate and to oscillate said actuator, and means for transforming said oscillating movement of the actuator into reciprocatory movement of the valve and for reciprocating the valve incident to reciprocatory movement of the actuator.

8. In a steam engine valve gear, a longitudinally reciprocable valve to be actuated, a support, a member pivotally carried by the support to rock in one plane, a second member supported by the first member to rock in a plane substantially at right angles to the first plane, a common actuator for rocking said members in their respective planes, and means to reciprocate the valve incident to the rocking of either of said members.

9. In a steam engine valve gear, a longitudinally reciprocable valve to be actuated, a support, a member pivotally carried by the support to rock in one plane, a second member supported by the first member to rock in a plane substantially at right angles to the first plane, a common actuator for rocking said members in their respective planes, and means to reciprocate the valve incident to the rocking of both of said members.

10. In a valve gear, a cylinder, a piston therefor, a valve chamber, a valve reciprocable therein for controlling the operation of the piston, a support, a lever carried by the support to swing in one plane, a reverse link supported by the lever to oscillate in another plane at an angle to the aforementioned plane, a common actuator for rocking the lever and the link in their respective planes, a common means to reciprocate the valve from the reverse link and from the lever, and means to reverse the direction of reciprocation of the valve incident to oscillation of the reverse link.

11. In a valve gear for engines of the class described, a cylinder, a valve chamber, steam ports communicating between said cylinder and valve chamber, a valve movable within the valve chamber to control said ports, a piston, a main crank, a pitman for operating said crank from said piston, an inclined angle crank secured to the main crank, a lap and lead lever, a reverse link supported by the lap and lead lever, an oscillating reverse link actuator connecting said lap and lead lever and said reverse link with said angle crank to effect oscillation of the reverse link and swinging movement of the lap and lead lever, a bell crank combination lever carried by the lap and lead lever, a connection between one arm of the bell crank and the valve, and a connection between the other arm of the bell crank and the reverse link.

12. In a valve gear for engines of the class described, a cylinder, a valve chamber, steam ports communicating between said cylinder and valve chamber, a valve movable within the valve chamber to control said ports, a piston, a main crank, a pitman for operating said crank from said piston, an inclined angle crank secured to the main crank, a lap and lead lever, a reverse link supported by the lap and lead lever, an oscillating reverse link actuator connecting said lap and lead lever and said reverse link with said angle crank to effect oscillation of the reverse link and swinging movement of the lap and lead lever, a slide block carried by the reverse link, a bell crank combination lever carried by the lap and lead lever, a radius rod connecting one arm of the bell crank combination lever with the block, a connection between the other arm of the bell crank combination lever and the valve, and means to adjust the block to different positions in the reverse link.

13. In a valve gear, a rotatable shaft, means to rotate said shaft, a valve to be actuated, a support, a lap and lead lever fulcrummed intermediate its ends, a bell crank combination lever pivoted to one end of said lever, a reverse link carrier supported by the other end of the lever, a reverse link carried by the carrier for oscillation in a plane at an angle to the pivotal axis of the lever, a reverse link block slidably carried by the reverse link, a radius rod connecting said block with one arm of the bell crank combination lever, an angle crank inclined outwardly from the axis of rotation of the said shaft and operable thereby, a common actuator for simultaneously reciprocating said lever about its fulcrum and oscillating said reverse link on said carrier, a connection between said common actuator and the inclined angle crank at a point eccentric of the axis of the shaft whereby rotation of the crank causes a combined reciprocation and oscillation of the common actuator, and an actuating connection between the valve and the other arm of the bell crank combination lever.

14. In a valve gear of the class described, a cylinder, a valve chamber, steam ports communicating between said cylinder and valve chambers, a valve movable within the valve chamber to control said ports, a piston, a main crank, a pitman for operating said main crank from said piston, an arm carried by the main crank and extending inwardly to the axis of rotation of the main crank, an angle crank inclining outwardly from the axis of rotation of the main crank, a lap and lead lever pivoted for oscillation in one plane, a reverse link supported by the lap and lead lever for oscillation in a plane transverse to the aforementioned plane, a member for oscillating said reverse link and reciprocating said lap and lead lever, means for swivelly connecting said member to said angle crank, and a combination member pivotally carried by the lap and lead lever for connecting said reverse link to said valve whereby reciprocation of the actuator causes lap and lead movement of the valve and oscillation of the reverse link causes linear advance movement of the valve.

15. In a valve gear of the class described, a cylinder, a valve chamber, steam ports communicating between said cylinder and valve chamber, a valve movable within the valve chamber to control said ports, a piston, a main crank, a pitman for operating said main crank from said piston, an arm carried by the main crank and extending inwardly to the axis of rotation of the main crank, an angle crank inclining outwardly from the axis of rotation of the main crank, a lap and lead lever pivoted for oscillation in one plane, a reverse link supported by the lap and lead lever for oscillation in a plane transverse to the aforementioned plane, a member for oscillating said reverse link and reciprocating said lap and lead lever, means for swivelly connecting said member to said angle crank, a combination member pivotally carried by the lap and lead lever for connecting said reverse link to said valve whereby reciprocation of the actuator causes lap and lead movement of the valve and oscillation of the reverse link causes linear advance movement of the valve, and means for shifting said connecting member with respect to said reverse link to effect changes in linear advance movement of said valve and to reverse the linear advance movement thereof.

16. In a valve gear of the class described, the combination with a valve adapted for longitudinal movement only, a lap and lead lever, an inclined crank, an actuating member connected to said lap and lead lever and to said inclined crank, said latter connection effecting rotary oscillating motion of said actuating member having reciprocatory and oscillatory components, said reciprocatory component communicating lap and lead movement to said lap and lead lever, means for converting said oscillatory component into linear advance movement, and including combination means intermediate said lap and lead lever and said valve for combining said lap and lead and linear advance movements and communicating said combined movements to said valve.

17. In a valve gear of the class described, the combination with a valve adapted for longitudinal movement only, of an inclined crank, an actuating member connected thereto and having rotary oscillating movement therewith effecting reciprocatory and oscillatory components of movement of said actuating member, and means intermediate said actuating member and said valve for converting said reciprocatory and oscillatory components of movement into lap and lead and linear advance movements of said valve in a longitudinal direction.

18. In a valve gear of the class described, the combination with a valve having a single component of movement, of an inclined crank, an actuating member connected thereto and having rotary oscillating movement therewith effecting reciprocatory and oscillatory components of movement of said actuating member, and means intermediate said actuating member and said valve for converting said reciprocatory and oscillatory components of movement into lap and lead and linear advance movements of said valve in the same plane.

WALTER F. ATWOOD.